3,423,511
METHOD OF TREATING VASCULAR AND MIGRAINE HEADACHES WITH 1,1 - DIPHENYL-4-(1-PIPERIDYL)-BUTANOL-1

Henry Clifford Carlson, Jr., Berwyn, and Louise H. Greenberg, Wayne, Pa., assignors to Smith Kline & French Laboratories, Philadelphia, Pa., a corporation of Pennsylvania
No Drawing. Filed Apr. 13, 1967, Ser. No. 630,543
U.S. Cl. 424—267         4 Claims
Int. Cl. A61k 27/00

ABSTRACT OF THE DISCLOSURE

Pharmaceutical dosage forms containing 1,1-diphenyl-4-(1-piperidyl)-butanol-1 or an acid addition salt thereof are administered internally for relief of vascular and migraine headaches in humans.

---

This invention relates to a method of treating vascular and migraine headaches with 1,1-diphenyl-4-(1-piperidyl)-butanol-1, also known as diphenidol. More specifically the method of this invention comprises administering to human beings 1,1-diphenyl-4-(1-piperidyl)-butanol-1 which has the following formula:

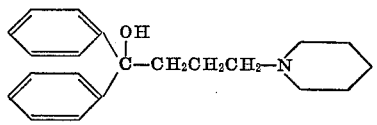

or a nontoxic organic or inorganic acid addition salt thereof in an amount sufficient to relieve vascular and migraine headaches.

Exemplary of nontoxic pharmaceutically acceptable acid addition salts of the compound of the above formula are those formed from the following acids: sulfuric, nitric, phosphoric, hydrochloric, hydrobromic, citric, acetic, lactic, tartaric, ethanedisulfonic, sulfamic, succinic, fumaric, maleic, benzoic and the like. These salts are prepared by methods known to the art.

The compound diphenidol is known to have antiemetic activity, see U.S. Patent 3,088,869. However it is unexpected that this compound would also be useful for the symptomatic treatment of vascular and migraine headaches.

In accordance with this invention 1,1-diphenyl-4-(1-piperidyl)-butanol-1 or a nontoxic acid addition salt thereof is administered internally to human beings, preferably with a pharmaceutical carrier in dosage units. The active medicament in dosage units is administered orally or parenterally, preferably divided into equal doses, until satisfactory relief is obtained. The daily dosage is from about 10 mg. to about 300 mg. of active medicament, advantageously from about 20 mg. to about 200 mg. When the method described above is carried out, relief is obtained from vascular and migraine headaches with a minimum of side effects.

The dosage units administered in accordance with the method of this invention are in the form of pharmaceutical compositions containing from about 10 mg. to about 100 mg. of medicament, advantageously from about 20 mg. to about 75 mg. per dosage unit, and a pharmaceutical carrier.

A wide variety of pharmaceutical forms can be employed and are prepared by methods well known to the art. If a solid pharmaceutical carrier is used, such as lactose, magnesium stearate, terra alba, sucrose, talc, stearic acid, gelatin, agar pectin, acacia and the like, the composition can be tableted, used as a pharmaceutical powder, placed in a hard gelatin capsule or in the form of a troche or lozenge. If a liquid pharmaceutical carrier is used, such as peanut oil, olive oil, sesame oil, water and the like, the composition can be in the form of a soft gelatin capsule or a liquid suspension. Similarly the carrier or diluent may include a time delay material such as glyceryl monostearate or glyceryl disterate alone or with a wax.

Parenteral dosage forms are obtained by dissolving a water soluble salt of the active medicament in water or saline solution in a concentration such that 1 cc. of the solution contains from about 10 mg. to about 25 mg. of active ingredient. The solution can then be filled into single ampuls or multiple dose vials.

The compounds diphenidol useful in the method of this invention is prepared by the following general procedure. Piperidine is alkylated with 1-bromo-3-chloropropane and the resulting 1-(3-chloropropyl)-piperidine, converted to the corresponding Grignard reagent, is reacted with benzophenone to give the 1,1-diphenyl-4-(1-piperidyl)-butanol-1 free base.

The following examples illustrate specific pharmaceutical compositions useful in the method of this invention and as such are not to be considered as limitations thereof.

EXAMPLE 1

Formula:                                          Per capsule, mg.
1,1 - diphenyl - 4-(1-piperidyl)-butanol-1 sulfate _____ [1] 57.92
Magnesium stearate _____ 2.00
Lactose (200 mesh) _____ 230.00

[1] Equivalent to 50 mg. free base.

The above ingredients are mixed, passed through a #40 screen, remixed and filled into #2 capsules.

EXAMPLE 2

Formula:                                       W./V. percentages
1,1 - diphenyl - 4-(1-piperidyl)-butanol-1 hydrochloride _____ [1] 2.24
Sodium tartrate _____ 1.09
Tartaric acid _____ 0.71
Water for parenterals, q.s. _____ 100.00

[1] Equivalent to 20 mg. free base per ml.

The tartaric acid and sodium tartrate are dissolved in an amount of the water equal to approximately 95% of the final volume and the solution is heated to 45–50° C. on a hot water bath. The 1,1-diphenyl-4-(1-piperidyl)-butanol-1 hydrochloride is added and mixed well to complete solubility. The resulting solution is slowly cooled to room temperature and the remainder of water is added. After filtering through a Millipore filter, the solution is filled into 2 ml. ampuls; fill=2.2 ml. per ampul.

What is claimed is:
1. A method of treating vascular and migraine headaches in a human being which comprises administering in- ternally to a human being in need of relief from said headaches a pharmaceutical dosage unit containing from about 10 mg. to about 100 mg. of 1,1-diphenyl-4-(1-piperidyl)-butanol-1 or a nontoxic acid addition salt thereof and a pharmaceutical carrier.

2. A method in accordance with claim 1 in which the administration is orally.

3. A method in accordance with claim 1 in which the administration is parenterally.

4. A method in accordance with claim 1 in which a daily dosage of from about 10 mg. to about 300 mg. of active medicament is administered.

References Cited

UNITED STATES PATENTS 2,881,165  4/1959  Janssen _____ 167—65
2,954,383  9/1960  Schlesinger _____ 167—65

OTHER REFERENCES

Chem. Abst. 63, page 16956C (1965).
The Merck Manual, 9th ed. (1956), pp. 1153–1154.

ALBERT T. MEYERS, *Primary Examiner.*

S. FRIEDMAN, *Assistant Examiner.*